Sept. 7, 1965

W. O. GRUBE 3,204,520

APPARATUS FOR MANUFACTURING FONT PLATES
FOR PHOTOTYPOGRAPHICAL MACHINES

Filed July 28, 1960

INVENTOR.
WOLFGANG O. GRUBE

BY
Frank G. Braham
ATTORNEY

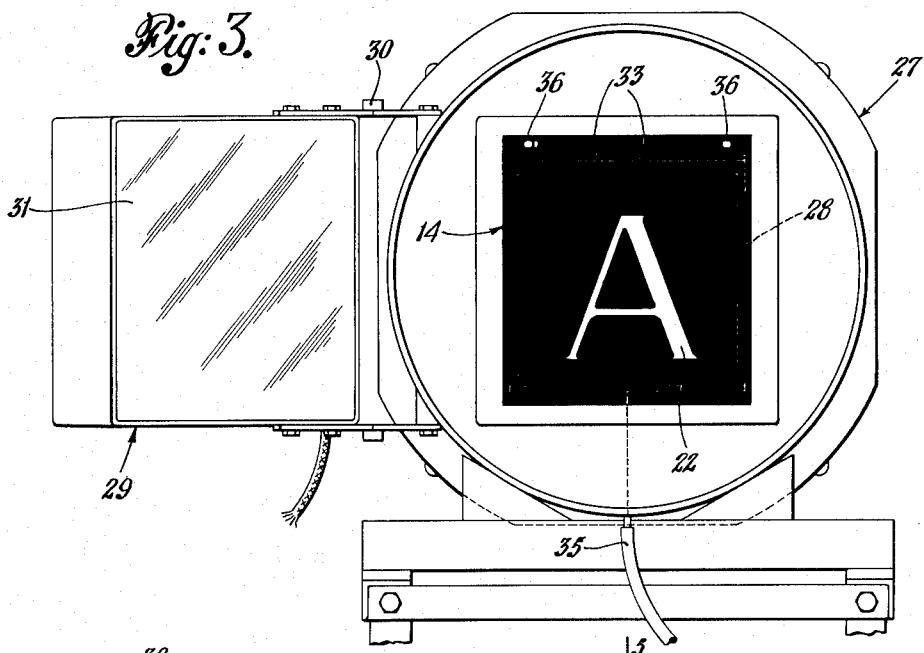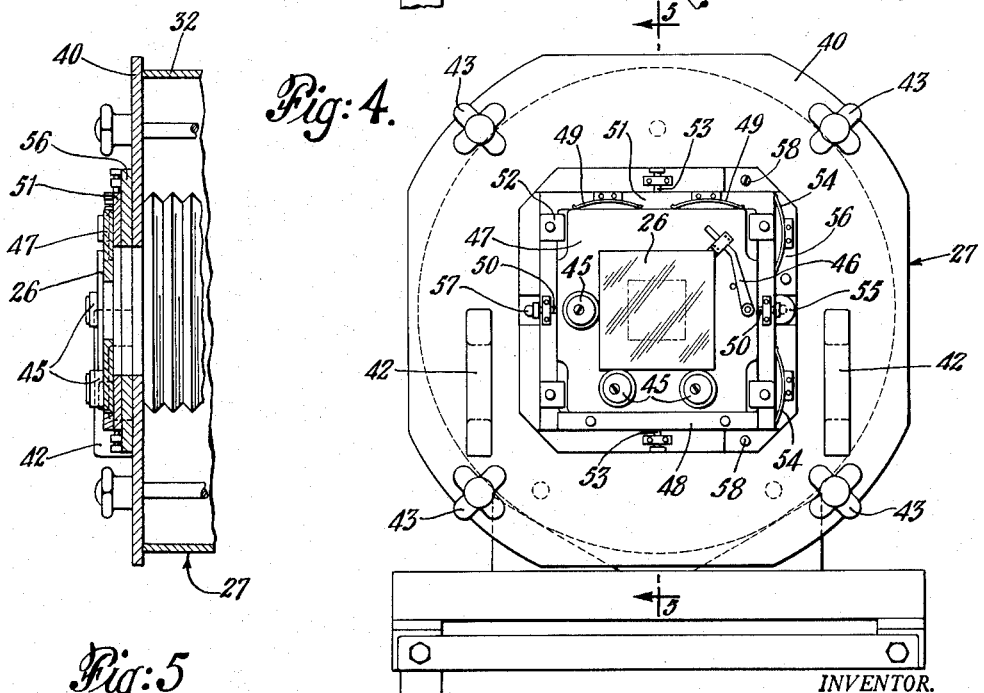

Sept. 7, 1965  W. O. GRUBE  3,204,520
APPARATUS FOR MANUFACTURING FONT PLATES
FOR PHOTOTYPOGRAPHICAL MACHINES
Filed July 28, 1960  3 Sheets-Sheet 3
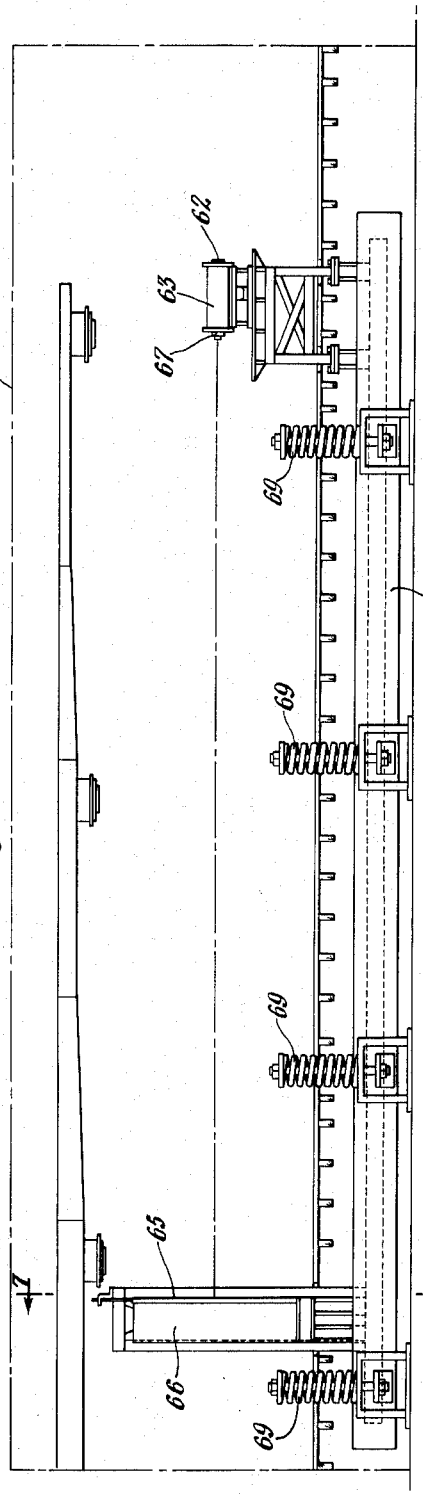
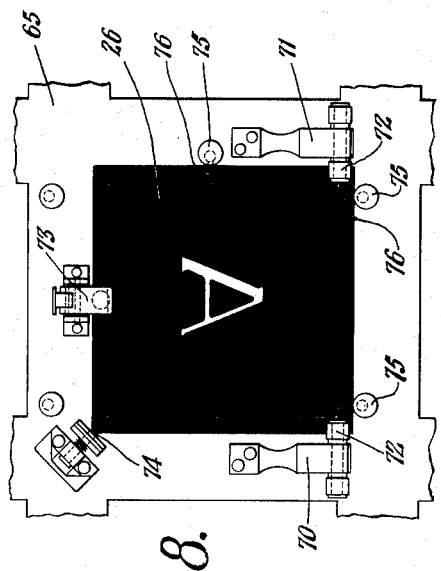
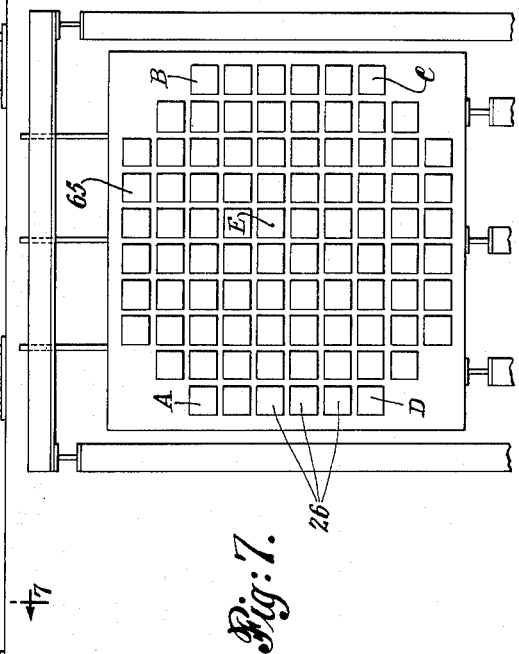
INVENTOR.
WOLFGANG O. GRUBE
BY
Frank G. Braham
ATTORNEY

United States Patent Office 3,204,520
Patented Sept. 7, 1965

3,204,520
APPARATUS FOR MANUFACTURING FONT PLATES FOR PHOTOTYPOGRAPHICAL MACHINES
Wolfgang O. Grube, Leonia, N.J., assignor to Eltra Corporation, a corporation of New York
Filed July 28, 1960, Ser. No. 45,989
2 Claims. (Cl. 88—24)

This invention relates to interchangeable character font plates for use in phototypographical composing machines of the general organization disclosed in U.S. application for Letters Patent Serial No. 419,012 filed March 26, 1954, and more particularly to the method of producing such font plates.

In a machine of the type described in the above mentioned application, a stationary font plate or film is provided, having an array of transparent characters disposed on an opaque background. A light source to one side of the font plate serves to project light through the transparent characters. A shutter mechanism interposed in the path of the projected light is actuated to shut off light from all of the characters except the one selected for photographing. The light passing through the selected character then enters a collimating lenslet individual to and associated with the particular character which collimates the light defining the character. Thereafter the collimated light is focused by an imaging lens common to all of the characters. A point size changing lens system controls the size of the finally recorded character images which are formed on a stationary film by a projection lens system mounted on a continuously moving line composing carriage.

It will be appreciated that the accuracy with which the character images are positioned on the sensitized sheet or film will in large measure be dependent on the accuracy with which they are formed on the font plate. The characters must be accurately positioned on the font plate to insure horizontal and vertical alignment on the sensitized film and ultimately on a printed page. Minute deviations from the desired positioning of the characters on the grids will cause misalignments eventually resulting in character images that are raised, lowered or tilted from their prescribed positions. Furthermore, since use of the machine involves the interchange of font plates either to change the type face style or for other purposes, it is essential that the characters be formed on the font plate in a predetermined position having extremely minute deviation tolerances. Also the font plate must be constructed so that when moved from a storage to an operating position in the machine it will take a fixed position. In this manner, with the font plate in photographic position in the phototypographical machine, each character thereon will be in its prescribed position relative to the optical system of the machine to thereby assume requisite typographical accuracy. Thus the object of the present invention is to provide an apparatus to produce font plates with characters uniformly and accurately positioned thereon.

Specifically, the present invention provides a method and an apparatus for producing master plaques from letter drawings and subsequently producing font plates from an array of master plaques. Briefly, the operator will begin with a letter drawing and trace the character on a frisket. The frisket will then be mounted on a copyboard and photographed by a reduction camera with a reduced image being reproduced on a glass plate called a master plaque. A number of master plaques with different characters will then be positioned on a second copyboard and this array will be photographed by a second reduction camera with a further reduced image being reproduced on a glass plate or negative called the font plate.

Features and advantages of the present invention will be gained from the foregoing and the description of a preferred form thereof which follows.

In the drawings:

FIG. 3 is an end view taken along the line 3—3 of FIG. 2;

FIG. 4 is an end view taken along the line 4—4 of FIG. 2;

FIG. 5 is a sectional view taken along the line 5—5 of FIG. 4;

FIG. 6 is a schematic representation of the character grid camera and copyboard system;

FIG. 7 is an elevation view taken along the line 7—7 of FIG. 6 showing the character grid copyboard;

FIG. 8 is a fragmentary view of one of the eighty-eight copyboard mounting mechanisms.

Figure 1:
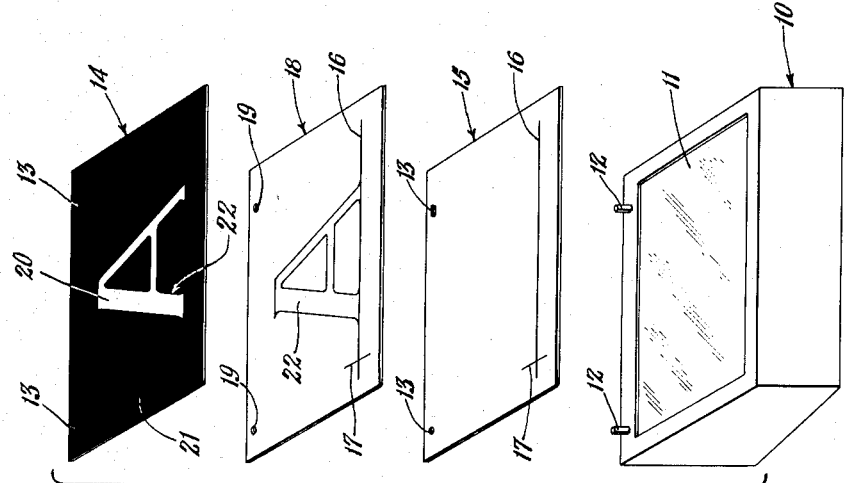
FIG. 1 is a schematic representation of the tracing apparatus utilized in reproducing a selected character on a frisket.

Initially the operator is supplied with a special tracing table 10 (FIG. 1) having a translucent top 11, an interior illuminating system, and the two registry pins 12. Both registry pins 12 are spaced to cooperate with the registry holes 13 in the frisket 14 hereinafter described. A clear or translucent punched registry sheet 15 having a Z line 16 and a side bearing cross 17 is then placed over pins 12 on table 10. Both the Z line 16 and the bearing cross 17 act as reference lines for subsequent alignment with the letter drawing 18. A selected letter drawing 18 also having a Z line 16 and bearing cross 17 is then positioned on pins 12 over registry sheet 15 and aligned to correspond with the Z line and bearing cross of sheet 15. This latter alignment of the letter drawing 18 with the registry sheet 15 is facilitated by the clearance holes 19 which are somewhat larger than the cooperating registry pins 12 thereby permitting limited horizontal and vertical alignment. Finally a frisket 14 having pre-punched registry holes 13, one of which is circular for accurate positioning and the other slotted for horizontal alignment, is located on pins 12 on table 10, the frisket 14 being placed over the letter drawing 18. In this position the frisket is ready to be cut.

The friskets 14 comprise a two layer material consisting of a clear Mylar base 20 and a soft red coating 21 which may be stripped from the base. They are generally cut to size 12″ x 13″ and pre-punched with the aforementioned registry holes 13 along the upper edge. When the frisket 14 has been positioned over the letter drawing 18 on table 10 the operator illuminates the table and traces the outline of the character 22 with a swivel-bladed film cutting knife, cutting through the red film only. He then strips out the character area leaving a transparent character on a red background. These characters are of an extremely large point size, ordinarily 769 or 785 points. Finally the friskets 14 are inspected allowing a maximum permissible deviation of 0.015 inch from the character outline or alignment of the letter drawing 18 and the registry sheet 15.

Figure 2:
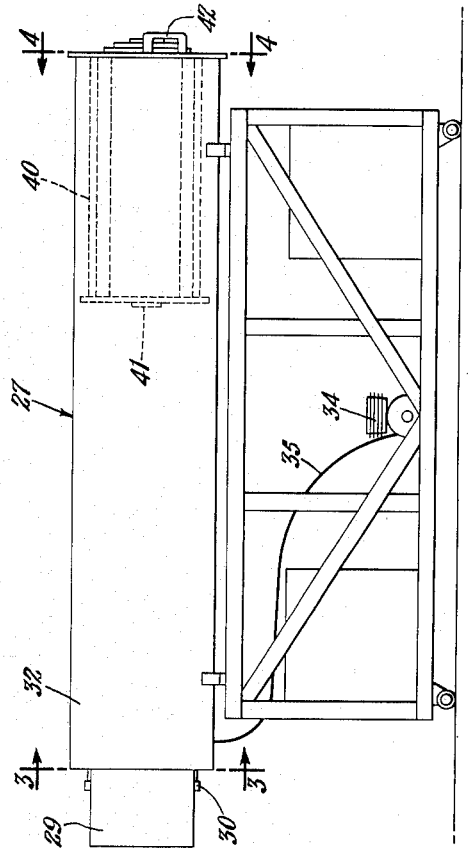
FIG. 2 is a side elevation view of the master plaque camera.

Once the frisket 14 is completed it will be photographed on a master plaque 26 (FIG. 4) in a first reduction camera called the master plaque camera 27 (FIG. 2). One end of the tubular housing 32 of camera 27 is provided with a transparent copyboard 28 and an illuminating box 29 which can be pivoted in and out of position on hinge 30 (FIG. 3). The illuminating box 29 has a translucent face 31 and is capable of producing continuous illumination for camera alignment purposes hereinafter described and also electronic flash for photographic exposures. Also mounted on the same end of camera 27 are the two registry pins 36 spaced to correspond with the registry pins 12 of table 10. A series of vacuum channels 33 encircling copyboard 28 and cooperating with the vacuum pump 34 (FIG. 2) through the vacuum tube 35 operate to hold a frisket 14 flatly on the face of copyboard 28.

The right hand end of housing 32 (FIG. 2) is adapted to accept a number of plug-in units 40 corresponding to the desired reduction in point size from the frisket 14 to the master plaque 26. The plug-in units 40 are actually fixed reduction cameras in themselves and are generally selected to reduce character point size to 150 or 75 points. Each unit 40 includes a mechanism for aligning and holding the alignment plaque and master plaques hereinafter described, and also has a fixed position mounting lens 41. These units 40 are manually moved into position through the use of the handles 42 and are fastened in operative position by the four latching knobs 43.

In preparation for photographing a selected frisket character 22, the plaque camera 27 and the copyboard 28 must be accurately aligned. For this reason the operator is provided with a master target frisket, similar to the frisket hereinbefore described, and a master alignment plaque hereinafter described. The target frisket is mounted on registry pins 36 (FIG. 3) and vacuum pump 34 is actuated to hold the target frisket flat against copyboard 28. The illuminating box 29 is now pivoted into position against the back of the mounted target frisket thereby providing continuous illumination for alignment with the plug-in unit 40. In this same manner all friskets 14 to be subsequently photographed will be accurately positioned on copyboard 28. The alignment plaque 26 which is mounted on the rear of camera 27 (FIG. 4) in a manner hereinafter described is a glass plate, identical to a master plaque, having the same character configuration as the target frisket in the proper size for the plug-in reduction unit 40 being used. Horizontal and vertical adjustment eccentric disks also hereinafter described are rotated until the plaque is aligned to the frisket image. This is accomplished with the aid of a microscope of at least 40X which is affixed to the rear of camera 27. When properly aligned, the image appears as clear areas on a dark background and any misalignment will appear as narrow light red lines at the edges of the clear areas.

In mounting the alignment plaque 26 it is manually positioned on the three eccentric disks 45 and is biased into contact with disks 45 by operation of the spring loaded arm 46 (FIG. 4). Arm 46 and eccentric disks 45 are mounted on the first frame 47. The eccentric disks 45 are adjusted for horizontal and vertical alignment of the alignment plaque with the target frisket as hereinbefore mentioned. Various size eccentric disks are provided to accomplish character kerning and vertical shifts. Frame 47 is biased against the banking bar 48 by operation of the tension springs 49, with bar 48 and springs 49 both being mounted on the frame 51 (FIGS. 4 and 5). The banking pins 50 also mounted on frame 51 regulate the horizontal movement of frame 47. Frame 47 is held flat on frame 51 by the four tabs 52 and frame 51 is vertically aligned by operation of points 53 mounted on the frame 56. The tension springs 54 and the eccentric disk 55 mounted on frame 56 regulate the horizontal alignment of frame 51. Finally, frame 56 is fastened to unit 40 by mounting screws 57 and 58. This entire mechanism comprising banking points, eccentric disks and frames is designed to facilitate optimum alignment between the alignment plaque 26 and the target frisket.

Once camera 27 is accurately aligned the target frisket is removed and the frisket 14 to be photographed is mounted on copyboard 28 as hereinbefore described. The room is now reduced to red safelight and the master alignment plaque is removed and replaced by a 5" x 5" x .19" glass plaque 26 provided with a thin emulsion coating. The new plaque is automatically aligned with the frisket since it replaces the alignment plaque on the previously adjusted mountings. The operator then photographs the frisket 14 by operating a push button triggering the electronic flash apparatus located in the illuminating box 29. The exposed plaque is removed and further exposed to an identification strip over a small print box after which it is processed in the conventional method for developing glass plaques.

Plaques are individually inspected by using the master plaque camera 27 as a projector. The camera back is aligned as hereinbefore stated and a strong light source is placed behind the camera. The operator places a plaque in position at the rear of the camera while a second operator places the corresponding frisket over the registry pins 36 on copyboard 28. The image projected on the frisket is inspected allowing a maximum error of 0.015 inch and at the same time inspected for flaws in the photographic plate such as pin holes in opaque areas or opaque spots in clear areas. Such flaws can usually be corrected by opaquing or manually etching the plaque.

Figure 9:
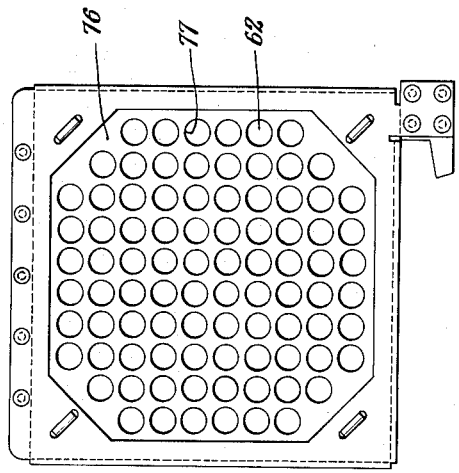
FIG. 9 is a plan view of a completed font plate.

Once the master plaques 26 have been completed they will be photographed on a font plate 62 (FIG. 9) in a second reduction camera called the character grid camera 63 (FIG. 6). The back of camera 63 is equipped with a mounting mechanism, identical with that described in U.S. application for Letters Patent Serial No. 624,135 filed Nov. 23, 1956, now U.S. Patent No. 2,976,786, issued Mar. 28, 1961, for holding and aligning font plates 62. Also camera 63 is provided with conventional adjustment contacts which are capable of moving the lensboard 67 vertically and horizontally in very small increments to properly locate the character array on the font plate 62.

The copyboard 65, capable of holding an array of eighty-eight master plaques 26 and having its own illuminating box 66, is mounted opposite camera 63 on the mutual base frame 64 (FIG. 6). Box 66 has a translucent face and is capable of providing continuous illumination for camera alignment purposes and stroboscopic flashlamp lighting for photographic exposures. Camera 63 and copyboard 65 are both permanently mounted on frame 64 at a specific distance from one another to provide reduced character point sizes on the font plates of 5 and 10 points. The entire character grid system is mounted in a sealed room 68 suspended on the springs 69 and maintained at a constant temperature of 70°. This uniform temperature limits expansion and contraction due to heat variations thereby eliminating the necessity of repeated adjustments of the apparatus to insure accuracy throughout the operation.

In preparation for photographing the master plaques camera 63 must be accurately aligned with copyboard 65 (FIG. 6). For this reason the operator is provided with a master font plate having eighty-eight crosses, scribed in an opaque background, corresponding to the centers of the character positions on copyboard 65. The master font plate is mounted on the back of camera 63 and the crosses are projected to image on a special alignment plaque similar to the plaques 26 heretofore described but having a broken clear cross against a white background. The alignment plaque is mounted in one of the eighty-eight positions on copyboard 65 (FIG. 7) and three eccentric locating posts hereinafter described are adjusted until the broken cross coincides with the cross projected through the character grid camera 63. A loupe is used for inspection and a maximum error of plus or minus 0.003 inch is permissable. Once alignment in one plaque position is completed the aligning apparatus hereinafter described is tightened and checked and the alignment plaque is moved to the next plaque position.

Initially the alignment plaque is manually placed on copyboard 65 (FIG. 7) in the position which is to be aligned first. The spring clamps 70 and 71 with bearing rollers 72 (FIG. 8) engaging the lower edge of the alignment plaque and the spring clamp 73 engaging the upper edge of the alignment plaque jointly hold the alignment plaque flat on the copyboard 65. Clamps 70 and 71 are each provided with two bearing rollers 72 and operate to bias adjacent plaques flatly against copyboard 65. The spring loaded point 74 biases the alignment plaque against the eccentric disks 75 which are manually adjusted to provide horizontal and vertical alignment of the alignment plaque. Once the alignment plaque is accurately positioned the socket head set screws 76 are tightened and the alignment plaque is moved to the next position. Each of the other copyboard plaque positions are equipped with the same aligning apparatus just described.

When all eighty-eight positions have been adjusted and all eccentrics locked it is necessary only to adjust the horizontal and vertical alignment at camera 63. To this end five alignment plaques are placed in copyboard positions A, B, C, D and E, (FIG. 7) and the master font plate crosses are projected on to copyboard 65. Alignment is inspected at the copyboard and the necessary adjustments are made to camera 63 giving a maximum error not exceeding plus or minus 0.003 inch. The master plaques 26 are now assembled on the copyboard 65 in the desired array making certain that all plaques are biased against eccentric disks 75 and held flat against copyboard 65. When in proper position the characters are wrong reading, i.e., mirror images, and inverted (FIG. 8).

The master font plate is removed from camera 63 and the room is reduced to red safelight conditions. An unexposed font plate 62 provided with an emulsion coating and a plate frame as disclosed in prior application for Letters Patent Serial No. 624,135 filed November 23, 1956, now U.S. Patent No. 2,976,786, issued March 28, 1961, is mounted in camera 63. Two flash lamp exposures are made allowing one minute to elapse between exposures in order to allow the flash lamp capacitors to charge. The exposed font plate 62 is now developed in the conventional method for glass plates of this type.

The font plate 62 is inspected by projecting it back through camera 63. Camera 63 is once again aligned with copyboard 65 as hereinbefore described and then the image on font plate 62 is projected on the copyboard 65. Deviation not exceeding 0.003 inch from character outlines is permissible. The grid is then placed on a light table and any pin holes are opaqued. Finally masks 76 with circular apertures 77 corresponding to each of the eighty-eight characters in the array are attached to the front and rear faces of the font plate (FIG. 9) whereupon the font plate is ready for use in a phototypographical operation.

Inasmuch as many apparent changes and modifications could be made to the described method and apparatus for manufacturing typographical font plates without departing from the spirit and scope of the invention, it is intended that the specification and drawings be interpreted as illustrative rather than in a limiting sense.

What is claimed is:

1. Apparatus for manufacturing, for use in a phototypesetting machine, a font plate having a complete font of typographical characters formed thereon, said apparatus comprising a plate holder for supporting a sensitized plate in a photographic position, a lens for projecting an image of a font of characters onto a plate supported by said plate holder, means for adjusting the lens relative to the plate holder in a plane parallel thereto for adjustably locating the font image on a sensitized plate, a copyboard comprising a plurality of means for supporting individual character plaques equal in number to the number of characters that go to make up a complete font of characters, each supporting means being adapted to adjustably position a plaque supported thereby, and illumination means for illuminating plaques that may be mounted on said copyboard so as to project simultaneously an image of all of the plaque characters to the sensitized surface of a plate supported in said plate holder.

2. Apparatus according to claim 1 wherein each supporting means for a character plaque comprises eccentric means for engaging two edges of a character plaque and biasing means for urging a plaque into engagement with said eccentric means.

References Cited by the Examiner
UNITED STATES PATENTS

| | | | |
|---|---|---|---|
| 413,106 | 10/89 | Stauffer | 96—41 |
| 2,315,101 | 3/43 | Zukmann | 96—44 |
| 2,383,568 | 8/45 | Rudnick | 96—44 |
| 2,607,268 | 8/52 | Bartz | 96—46 X |
| 2,866,704 | 12/58 | Korkesz et al. | 96—46 X |
| 2,902,770 | 9/59 | Mulcahy | 96—41 X |
| 2,950,662 | 8/60 | Higonnet et al. | 95—4.5 |
| 2,972,533 | 2/61 | Frankau et al. | 96—41 X |
| 2,975,694 | 3/61 | Pell | 96—41 X |
| 2,981,148 | 4/61 | Sausele | 88—24 |

NORTON ANSHER, *Primary Examiner.*

PHILIP E. MANGAN, LOUISE P. QUAST,
*Examiners.*